United States Patent
Hovell et al.

(10) Patent No.: US 7,188,191 B1
(45) Date of Patent: Mar. 6, 2007

(54) PACKET NETWORK INTERFACING

(75) Inventors: Peter Hovell, Woodbridge (GB); John R King, Woodbridge (GB); John Patterson, Ipswich (GB)

(73) Assignee: British Telecommunications public limited company, London (GB)

(*) Notice: Subject to any disclaimer, the term of this patent is extended or adjusted under 35 U.S.C. 154(b) by 529 days.

(21) Appl. No.: 10/069,359

(22) PCT Filed: Sep. 25, 2000

(86) PCT No.: PCT/GB00/03684

§ 371 (c)(1),
(2), (4) Date: Feb. 25, 2002

(87) PCT Pub. No.: WO01/22683

PCT Pub. Date: Mar. 29, 2001

(30) Foreign Application Priority Data

Sep. 24, 1999 (EP) .................................. 99307551

(51) Int. Cl.
*G06F 15/16* (2006.01)
(52) U.S. Cl. ..................... 709/245; 709/246; 709/230
(58) Field of Classification Search ............... 709/245, 709/246, 230
See application file for complete search history.

(56) References Cited

U.S. PATENT DOCUMENTS

| | | | |
|---|---|---|---|
| 5,802,285 A | 9/1998 | Hirviniemi | |
| 6,038,233 A * | 3/2000 | Hamamoto et al. | 370/401 |
| 6,172,986 B1 * | 1/2001 | Watanuki et al. | 370/466 |
| 6,690,669 B1 * | 2/2004 | Tsuchiya et al. | 370/392 |
| 6,708,219 B1 * | 3/2004 | Borella et al. | 709/245 |
| 6,781,991 B1 * | 8/2004 | Anderlind | 370/394 |

FOREIGN PATENT DOCUMENTS

| | | |
|---|---|---|
| EP | 0840482 A1 | 5/1998 |
| WO | WO 01/06734 A2 | 1/2001 |

OTHER PUBLICATIONS

R. Callon, D. Haskin, "Routing Aspects of IPv6 Transition", RFC 2185, http://rfc.sunsite.dk/rfc/rfc2185.html, Sep. 1997.*
A. Conta, S. Deering, "Generic Packet Tunneling in IPv6 Specification", RFC 2473, www.faqs.org/rfcs/rfc2473.html, Dec. 1998.*
Lee et al, "The Next Generation of The Internet: Aspects of the Internet Protocol Version 6", IEEE Network, IEEE Inc. New York, US, vol. 12, No. 1, 1998, pp. 28-33, XP000739805.
Tsirtsis et al, RFC2766: Network Address Translation—Protocol Translation (NAT-PT) Request for Comment Feb. 2000.
Internet Document—IETF Introduction to IPV6, www.ietf.org/internet-drafts/draft-ietf-ngtrans-introduction-to-ipv6-transition-05.txt.
Laborde, "Understanding and Implementing Effective VPNS" Computer Technology Review, US, Westworld Production Co., Los Angeles, vol. 18, No. 2, Feb. 1, 1998, pp. 12, 14, 16.

* cited by examiner

Primary Examiner—Jason Cardone
Assistant Examiner—Minh-Chau N. Nguyen
(74) Attorney, Agent, or Firm—Nixon & Vanderhye P.C.

(57) ABSTRACT

An interface for use between two IPv6 domains separated by an IPv4 domain includes a protocol converter, an encapsulator/un-encapsulator and a controller.

19 Claims, 6 Drawing Sheets

PACKET NETWORK INTERFACING

This application is the US national phase of international application PCT/GB00/03684 filed 25 Sep. 2000 which designated the U.S.

RELATED APPLICATIONS

This application is related to commonly assigned copending applications Ser. No. 10/069,295 filed Feb. 25, 2002 and Ser. No. 10/468,780 filed Aug. 21, 2003.

BACKGROUND

1. Technical Field

This invention relates to an interface between a first network operating in accordance with a first transmission protocol and having network addresses in accordance with a first addressing convention, herein referred to as first type addresses, and a second network operating in accordance with a second transmission protocol and having network addresses in accordance with a second addressing convention, herein referred to as second type addresses; and to the tunnelling of packets across the second network from one such interface to another such interface; and relates particularly, but not exclusively, to communication between hosts in respective Internet Protocol version 6 (IPv6) domains separated by an Internet Protocol version 4 (IPv4) domain.

Herein, the terms packet and message are used interchangeably and have the same meaning, and the term Internet domain is used as a specific example of a network.

2. Related Art

In Internet technology, it had become apparent that the initial transport protocol, IPv4, needed to be enhanced, principally to increase the available address space and add a hierarchical address structure. The result was IPv6 which has a simplified header format compared with IPv4, but which uses 128 bit addresses as compared with 32 bit addresses used in IPv4.

Readers wishing to have an overview of this general transitional area might like to access a list of Internet-Drafts, which are working documents of the Internet Engineering Task Force (IETF), at http://www.ietf.org/1id-abstracts.txt, and a particularly relevant document is "A Guide to the Introduction of IPv6 in the IPv4 World" <draft-ietf-ngtrans-introduction-to-ipv6-transition-01.txt>, also referred to as "Guide to IPv6 Transition".

As mentioned, the present invention relates to tunnelling. Known tunnelling techniques are of two types: configured and automatic.

A configured tunnel is created by manual configuration of a tunnelling interface between an IPv6 domain and an IPv4 domain such that all packets received from the IPv6 domain are encapsulated in IPv4 packets addressed to a specific tunnel end point, i.e. the tunnelling interface between the IPv4 domain and the remote IPv6 domain containing the destination IPv6 host.

An automatic tunnel on the other hand does not need manual configuration: the tunnel and points are automatically determined. Several automatic tunnelling mechanisms are currently in development within the IETF, these being known in the art as, 6over4, 6to4, Dynamic Tunnelling, and Tunnel Broker.

For more detailed information on 6over4 the reader can obtain from the IETF, the document known as RFC2829, or any variant thereof, "Transmission of IPv6 over IPv4 Domains without Explicit Tunnels", by B. Carpenter and C. Jung, March 1999.

For more detailed information on 6to4 the reader can obtain from the IETF, the document known as draft-ietf-ngtrans-6to4-02.txt, or any variant thereof, "Connection of IPv6 Domains via IPv4 Clouds without Explicit Tunnels", by B. Carpenter and K. Moore.

For more detailed information on Dynamic Tunnelling the reader can obtain from the IETF, the document known as draft-ietf-ngtrans-dti-00.txt.

For more detailed information on Tunnel Broker the reader can obtain from the IETF, the document known as draft-ietf-ngtrans-broker-00.txt.

These known automatic tunnelling mechanisms use a variety of techniques to enable the tunnel to be automatically established:

6over4 Multicast
    6to4 Special IPv6 address in which the top level aggregator (TLA) contains an identifier for the 6to4 tunnelling mechanism, and the next level aggregator (NLA) contains the IPv4 address of the tunnel end point
    Dynamic Tunnelling via DNS
    Tunnel Broker www based tool European patent application EP 840 482 discloses a method of communicating between an IPv4 terminal and an IPv6 terminal, in particular a method of performing protocol conversion on IPv4 packets and IPv6 packets using converting apparatus located between IPv4 and IPv6 networks. EP 840 482 states that there are several known methods for communicating between IPv4 and IPv6 terminals, and discusses the aforementioned tunnelling methods, among others. EP 840 482 asserts that there are several problems with these existing methods, and accordingly provides a new method for IPv4-IPv6 internetworking. Their method is explained by means of an example: considering the case of an IPv4 terminal C requesting communications with an IPv6 terminal A. The IPv4 terminal sends a name lookup request for a host A in the IPv6 network. This request is received by the converting apparatus, which forwards the request to a DNS server. The DNS server returns an IPv6 network address to the converting apparatus, which assigns an IPv4 address from a pool of addresses (from a Dynamic Host Configuration Protocol (DHCP) server) to the returned IPv6 address. The converting apparatus stores the mapping between the assigned IPv4 address and the returned IPv6 address, and forwards the assigned IPv4 address to the requesting host C. In subsequent communications between hosts C and A, host C sets the destination address to be the assigned IPv4 address for outgoing packets, and sends the packets to the assigned IPv4 address of Host A; conventional IP routing ensures that the packet routes to the converting apparatus. The converting apparatus then looks up the mapping between assigned IPv4 address and IPv6 address to retrieve the IPv6 address of host A, and makes this the destination address of the packet.

EP 840 482 thus presents a new method of IPv4/IPv6 networking.

BRIEF SUMMARY

According to a first aspect of the present invention, there is provided, an interface for use between a first network operating in accordance with a first transmission protocol and having network addresses in accordance with a first addressing convention, herein referred to as first type addresses, and a second network operating in accordance with a second transmission protocol and having network addresses in accordance with a second addressing convention, herein referred to as second type addresses, the interface having both a first type address and a second type address and comprising:

a protocol converter arranged to convert a message having a format in accordance with the first transmission protocol, herein referred to as a first type message, into a message having a format in accordance with the second transmission protocol, herein referred to as a second type message;

means for encapsulating arranged to respond to receipt of a second type address together with a first type message by encapsulating that received first type message as the payload of a resulting encapsulating second type message, using that received second type address as the destination address of the resulting encapsulating second type message and using the second type address of the interface as the source address of the resulting encapsulating second type message; and an interface controller arranged to respond to receipt by the interface of a first type message from the first network by examining the destination address of that first type message received from the first network to determine whether the first type message is of a predetermined format, and if so, sending to the protocol converter that first type message received from the first network else, deriving, directly or indirectly, from the destination address of that first type message, a second type address for use by the encapsulating means, and sending to the encapsulating means the derived second type address together with that first type message received from the first network.

Preferably, the controller is arranged to derive the second type address directly by retrieving it from a predetermined subaddress field of the destination address.

Alternatively, the controller is arranged to derive the second type address indirectly by accessing, in accordance with the destination address, a look-up table having entries in the form of a first type address associated with a second type address, and retrieving the second type address of an entry having a first type address matching the destination address.

Preferably, each entry of the address conversion table comprises a field for containing an identifier for identifying whether the controller is to send that first type message received from the first network to the protocol converter or to the encapsulating means.

The encapsulating means may comprise a plurality of different encapsulators, each encapsulator being arranged to operate in accordance with a respective encapsulation type, and the controller being arranged to determine whether the destination address of that first type message received from the first network is of one of a respective, corresponding plurality of predetermined formats, and, it so, to send that first type message received from the first network to the encapsulating means corresponding to that one predetermined format.

Preferably, each entry of the address conversion table comprises a field for containing an identifier for identifying a type of encapsulation whether the controller is to send that first type message received from the first network to the protocol converter or to the encapsulating means.

According to a second aspect of the present invention, there is provided, a method of operating an interface between a first network operating in accordance with a first transmission protocol and having network addresses in accordance with a first addressing convention, herein referred to as first type addresses, and a second network operating in accordance with a second transmission protocol and having network addresses in accordance with a second addressing convention, herein referred to as second type addresses, the method comprising the steps of:

examining the destination address of a first type message received from the first network; and if the destination address of that received first type message is of a first predetermined format, protocol converting that received first type message;

else, encapsulating that received first type message in accordance with the second transmission protocol, using, as the destination address of a resulting encapsulating second type message, a second type address derived, directly or indirectly, from the destination address of that received first type message.

According to a third aspect of the present invention, there is provided, a method of operating an interface between a first network operating in accordance with a first transmission protocol and having network addresses in accordance with a first addressing convention, herein referred to as first type addresses, and a second network operating in accordance with a second transmission protocol and having network addresses in accordance with a second addressing convention, herein referred to as second type addresses, the method comprising the steps of:

examining the destination address of a first type message received from the first network; and if the destination address of that received first type message is of a first predetermined format, protocol converting that received first type message; and if the destination address of that received first type message is of a second predetermined format, encapsulating that received first type message in accordance with the second transmission protocol, using, as the destination address of a resulting encapsulating second type message, a second type address derived, directly or indirectly, from the destination address of that received first type message.

Preferably, the second predetermined address format includes an identifier identifying an encapsulation type.

According to a fourth aspect of the present invention, there is provided an interface apparatus for performing the method of the second aspect of the present invention, the interface apparatus comprising:

means for examining the destination address of a first type message received at the interface apparatus from the first network to determine whether the destination address of that received first type message is of a first predetermined format;

a protocol converter responsive to a determination of the examining means that the destination address of that received first type message is of the first predetermined format to convert that received first type message; and means for encapsulating responsive to a determination of the examining means that the destination address of that received first type message is not of the first predetermined format to encapsulate that received first type message in accordance with the second transmission protocol, using, as the destination address of a resulting encapsulating second type message, a second type address derived, directly or indirectly, from the destination address of that received first type message.

The first predetermined format may include a first predetermined portion whose content identifies that received first type message as suitable for protocol conversion.

The first predetermined format may also include a second predetermined portion whose content constitutes the second type address used as the destination address of a resulting encapsulating second type message.

Preferably, the second type address is derived directly by retrieving it from a predetermined subaddress field of the destination address.

Preferably, the examining step comprises the substeps of retrieving the destination address from the received first type message, and accessing a look-up table in accordance with the retrieved destination address.

More preferably, in methods for use when the look-up table comprises entries in the form of a first type address associated with a second type address, retrieval of the second type address of an entry having its first type address matching the destination address constitutes indirectly deriving the second type address from the destination address of that received first type message.

In methods for use when the look-up table entries include a first identifier field containing an identifier identifying whether that first type message is to be protocol converted or encapsulated, there may be included the steps of retrieving the identifier from the first identifier field of the entry having its first type address matching the destination The first predetermined format may also include a second predetermined portion whose content constitutes the second type address used as the destination address of a resulting encapsulating second type message.

Preferably, the second type address is derived directly by retrieving it from a predetermined subaddress field of the destination address.

Preferably, the examining step comprises the substeps of retrieving the destination address from the received first type message, and accessing a look-up table in accordance with the retrieved destination address.

More preferably, in methods for use when the look-up table comprises entries in the form of a first type address associated with a second type address, retrieval of the second type address of an entry having its first type address matching the destination address constitutes indirectly deriving the second type address from the destination address of that received first type message.

In methods for use when the look-up table entries include a first identifier field containing an identifier identifying whether that first type message is to be protocol converted or encapsulated, there may be included the steps of retrieving the identifier from the first identifier field of the entry having its first type address matching the destination address, and checking that the retrieved identifier is consistent with whichever of protocol conversion or encapsulation is to be performed upon that received first type message.

In methods for use when the look-up table entries include a second identifier field containing an identifier identifying an encapsulation type, and when there is a plurality of encapsulation types available, there may be included the steps of retrieving the identifier from the second identifier field of the entry having its first type address matching the destination address, and checking that the retrieved identifier is consistent with the type of encapsulation to be performed upon that received first type message.

Protocol converters are known for enabling an IPv6 host to send messages to an IPv4 host. When a new IPv6 host is activated in an IPv6 domain, it employs the technique known as Neighbourhood Discovery (ND) to find out the identity of hosts with whom it can communicate directly. It broadcasts an ND message containing its IPv6 network address, and each host that receives it sends a reply message containing that host's IPv6 network address. Since the domain uses an underlying transport mechanism, say Ethernet using media access control (MAC) addresses, each host receiving the ND message will retrieve the new host's IPv6 network address and also the MAC address of the new host, and the new host will retrieve from each reply message the sending host's IPv6 network address and its MAC address.

The new host now constructs an ND table in which each entry corresponds with a neighbouring host and comprises a first part in the form of the 128 bit IPv6 address of that neighbouring host, and a second part in the form of the associated MAC address.

The interface device (containing the protocol converter) between that IPv6 domain and an adjacent IPv4 domain will also have received the ND message and sent a reply message, and the new host will have made a special Default entry in the ND table having its first part formed by 128 zeros (in variants, these are all ones) and its second part formed by the MAC address of that interface device.

Thus, when that new host wants to send a message to one of the other hosts in its domain, it constructs an IPv6 message and accesses its ND table to retrieve the MAC address associated with the destination address. The message is then encapsulated within an Ethernet packet in known manner and sent via the underlying Ethernet transport mechanism to the destination host.

If, on the other hand, the host constructs an IPv6 message having its destination address in the form of an IPv4-compatible or IPv4-mapped address, i.e. a message intended for an IPv4 host in the adjacent IPv4 domain, this destination address will not be found in the ND table. In this situation, the accessing algorithm will return the MAC address of the Default entry, and the message will be sent to the protocol converter.

Protocol converters can only convert (or translate) between corresponding fields of the headers of the IPv6 and IPv4 messages. Where a field in the header of, say, an IPv6 message has no corresponding field in the header of an IPv4 message, or vice versa, the information in that field will be lost in the protocol conversion process.

As mentioned above, tunnelling techniques are known for enabling IPv6 hosts to communicate amongst themselves when they are in spaced-apart domains. In this case, the interface device contains a tunnelling mechanism instead of a protocol converter. It will be appreciated that before now, for an IPv6 host to be able to communicate both with IPv4 hosts and with remote IPv6 hosts, it was necessary for that IPv6 host and the domain interface to be dual stack, i.e. having both IPv4 and IPv6 communication capability. If an IPv6 host was not dual stack, its accessing algorithm would return only a single MAC address for the Default entry This would be the MAC address of the input port of a protocol converter, if the network administration had decided that the IPv6 host is to be able to communicate with IPv4 hosts, or it would be the MAC address of the input port of a tunnelling mechanism, if the network administration had decided that the IPv6 host is to be able to communicate with IPv6 hosts. That Default entry MAC address could not be a common input address for both the protocol converter and the tunnelling mechanism.

BRIEF DESCRIPTION OF THE DRAWINGS

Specific embodiments of the present invention will now be described with reference to the drawings in which.

DETAILED DESCRIPTION OF EXEMPLARY EMBODIMENTS

Figure 1:
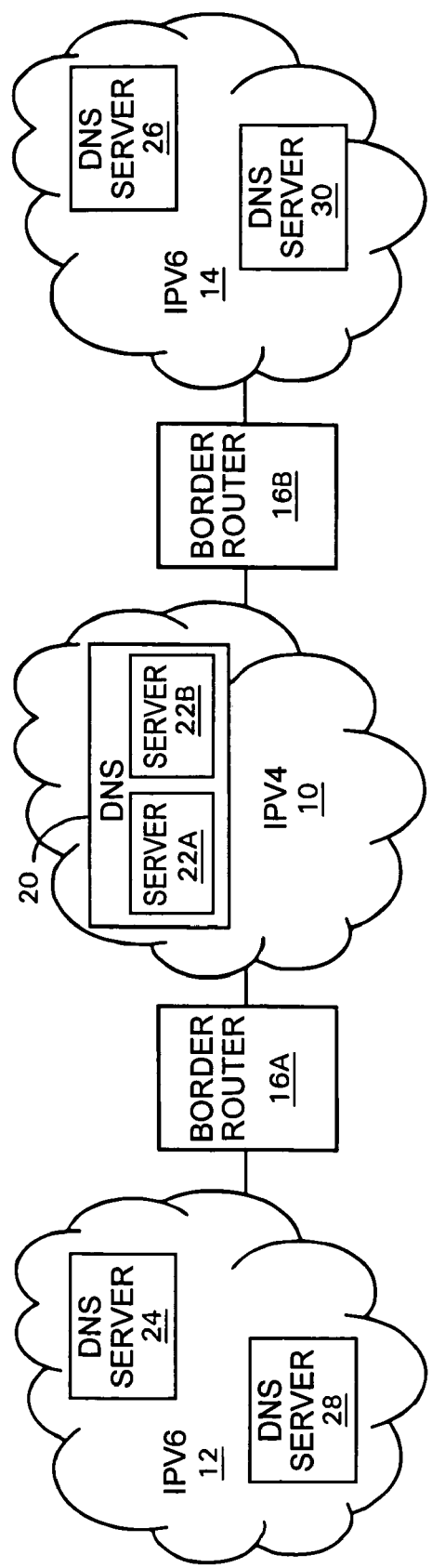
FIG. 1 is a schematic diagram of an IPv4 domain interfaced with two isolated IPv6 domains.

In FIG. 1, an IPv4 domain 10 separates a first IPv6 domain 12, constituting a first network operating in accordance with a first transmission protocol and having network addresses in accordance with a first addressing convention, from a second IPv6 domain 14, constituting a third network also operating in accordance with the first transmission protocol and having network addresses in accordance with the first addressing convention. Hosts in the IPv4 domain 10 are IPv4 only, and hosts in the IPv6 domains 12 and 14 are IPv6 only.

The IPv4 domain 10 constitutes a second network operating in accordance with a second transmission protocol and having network addresses in accordance with a second addressing convention. For simplifying the drawings, no IPv4 hosts are shown, and in each of the IPv6 domains 12 and 14 only one IPv6 host (28 and 30, respectively, as referred to later) is shown.

The first IPv6 domain 12 is connected to the IPv4 domain 10 via a border router 16A, and the second IPv6 domain 14 is connected to the IPv4 domain 10 via a border router 16B. The border router 16B is identical to the border router 16A, and each constitutes an interface.

The IPv4 domain 10 contains a complete domain name system (DNS) 20 including a plurality of DNS servers 22, of which only two DNS servers 22A and 22B are shown, and the IPv6 domains 12 and 14 contain respective DNS servers 24 and 26.

Suppose that a host 28 in the first IPv6 domain 12 wishes to send a packet to a host 30 in the second IPv6 domain 14. Thus, for this transaction, the host 28 is referred to as the source host 28 and the host 30 is referred to as the destination host 30.

The source host 28 knows the name of the destination host 30, so it constructs in known manner an IPv6 DNS Request message (not shown) requesting the IPv6 address of the destination host 30. The source host 28 sends this DNS Request message as a recursive request to its local DNS server, which in this embodiment is the DNS server 24. The DNS server 24 will, in known manner, send a number of iterative DNS Request messages (not shown) to the DNS 20 until it learns about the DNS server 26. Finally, a DNS Request message (not shown) will go to the DNS server 26 requesting the IPv6 address of the destination host 30.

As the DNS request passes from the first IPv6 domain 12 through the border router 16A to the IPv4 domain 10, it is processed by a protocol converter (PC) 32A (see FIG. 2) and undergoes IPv6/IPv4 translation. Correspondingly, as the DNS request passes from the IPv4 domain 10 through the border router 16B to the second IPv6 domain 14, it is processed by a protocol converter 32B and undergoes IPv4/IPv6 translation.

The protocol converters 32A and 32B conform to a specification known as Network Address Translation-Protocol Translation (NAT-PT). They translate between IPv4 and IPv6 addresses and keep state during the time of the session, and translation between IPv4 and IPv6 DNS Request messages and DNS Response messages, including translation of IP headers and DNS payload information is controlled by an application layer gateway (ALG). In the art, an alternative term for a DNS Response message is a DNS Answer message.

For more detailed information the reader can obtain from the Internet Engineering Task Force (IETF), the document known as draft-ietf-ngtrans-natpt-05.txt, or any variant thereof, "Network Address Translation—Protocol Translation (NATPT)", by G. Tsirtsis and P. Srishuresh.

Figure 3:
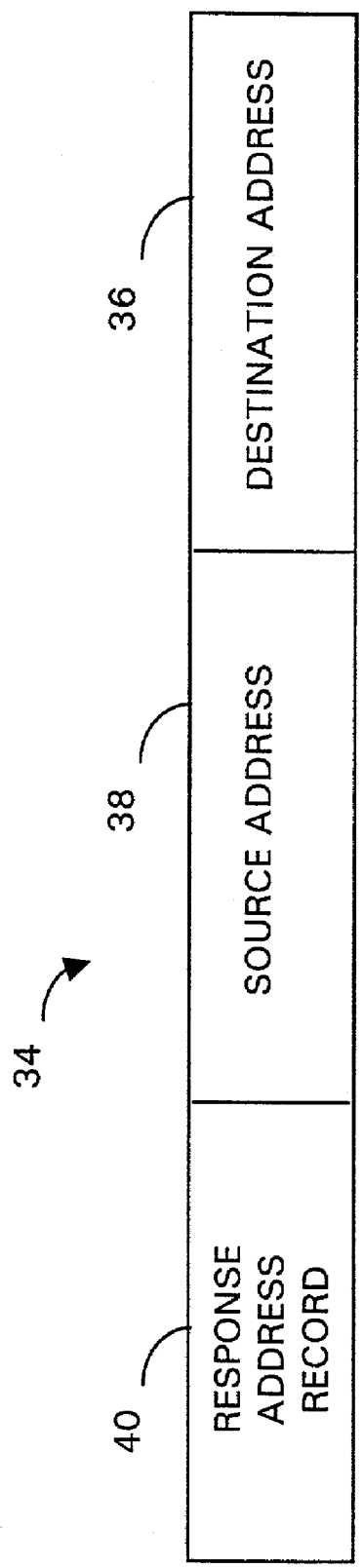
FIG. 3 is a schematic diagram of an IPv6 DNS Response message.

The DNS server 26 responds to the DNS Request message for the IPv6 address of the destination host 30 with a IPv6 DNS Response message 34 (see FIG. 3) having a conventional format of destination address field 36, source address field 38, and response address record 40 that contains the IPv6 address of the destination host 30.

Figure 4:
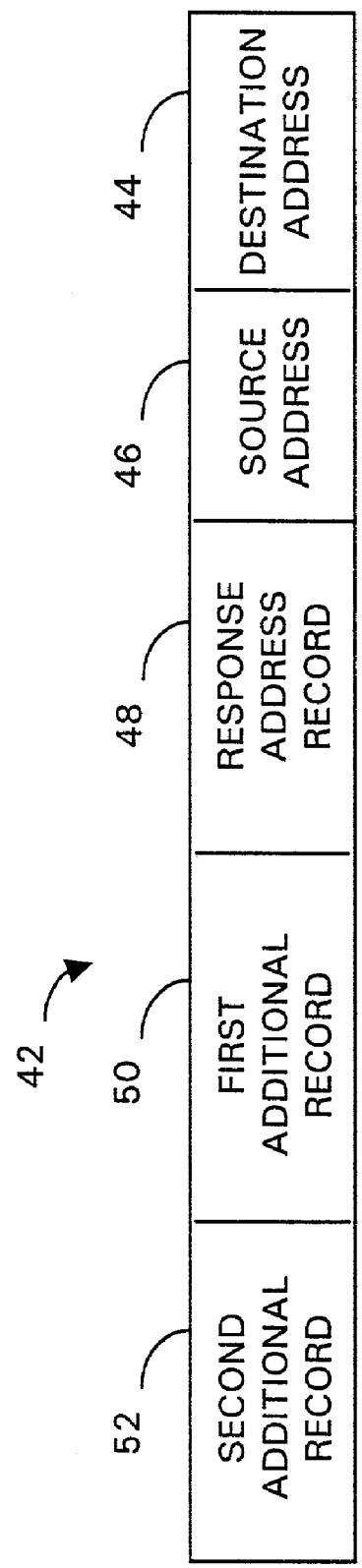
FIG. 4 is a schematic diagram of an IPv4 DNS Response message resulting from conversion of the IPv6 DNS Response message of FIG. 3.

This IPv6 DNS Response message 34 travels through the second IPv6 domain 14 to the border router 16B where it becomes converted to an IPv4 DNS Response message 42 (see FIG. 4) comprising destination address field 44, source address field 46, response address record 48 and, in accordance with the present invention, additional records 50 and 52, and this message 42 travels through the IPv4 domain 10 to the border router 16A where it becomes converted to an IPv6 DNS Response message 54 comprising destination address field 56, source address field 58 and response address record 60, and sent to the source host 28. The route that the DNS Response message (in its various forms, i.e. 34, 42 and 54) takes in the domains 10, 12 and 14 depends on the DNS configuration in each of the domains, but it will have to pass through the border router 16B and the border router 16A in that order.

For convenience, the terms "field" and "record" are used synonymously and interchangeably in this description, although in the art a field is generally taken to be a component part of a record.

When the IPv6 DNS Response message 34 is received by the border router 16B via its IPv6 network interface controller 62B, it is fed in parallel to the protocol converter 32B and to a controller 64B, and also to an encapsulator 86B and a 6to4 encapsulator 90B. The controller 64B is connected via a control line 65A to control inputs of the protocol converter 32B, the encapsulator 86B and the 6to4 encapsulator 90B and by placing a suitable address on the control line 65A selects the appropriate one of these devices.

The controller 64B (i) recognises that the received message is a DNS Response message and enables the protocol converter 32B, (ii) retrieves the IPv6 address from the response record 40 and writes this message to a storage location 66B formed by part of its internal memory 68B; (iii) writes the IPv4 address of the border router 16B, i.e. the IPv4 address of the tunnel terminating endpoint on the border router 16B, to a storage location 70B also formed by part of its internal memory 68B; (iv) receives from the protocol converter 32B the converted DNS Response message 42; appends the content of the storage location 70B as the first additional record 50, and the content of the storage location 68B as the second additional record 52; and (v) sends the resulting IPv4 DNS Response message 42 to an IPv4 network interface controller 72B for transmission over the IPv4 domain 10 to the border router 16A.

In a variant, the received IPv6 DNS Response message 34 is fed only to the controller 64B, which writes this message to a storage location 74B formed by part of its internal memory 68B. The controller 64B then (i) retrieves the IPv6 address from the response record 40 and writes this message to the storage location 66B; (ii) writes the IPv4 address of the border router 16B to the storage location 70B; (iii) generates a modified IPv6 DNS Response message by retrieving the content of the storage location 66B and appending the content of the storage location 70B as the first additional record 50, and the content of the storage location 66B as the second additional record 52; and (iv) sends this modified IPv6 DNS Response message to the protocol converter 32B. The ALG of the protocol converter 32 processes only the header and address response record of the DNS Response message to produce the resulting IPv4 DNS Response message 42, i.e. it allows the additional records to remain unchanged.

It will be appreciated that the feeding of the received message directly to the protocol converter 32B, and the sending of an enabling signal on the control line 65A to the protocol converter 32B by the controller 64B is logically equivalent to the sending of the received message to the protocol converter 32B by the controller 64B in the above variant, and constitutes sending the message to the protocol converter 32B in accordance with the present invention.

When the IPv4 DNS Response message 42 is received by the border router 16A via its IPv4 network interface controller 72A, it is fed in parallel to the protocol converter 32A and to a controller 64A.

Figure 5:
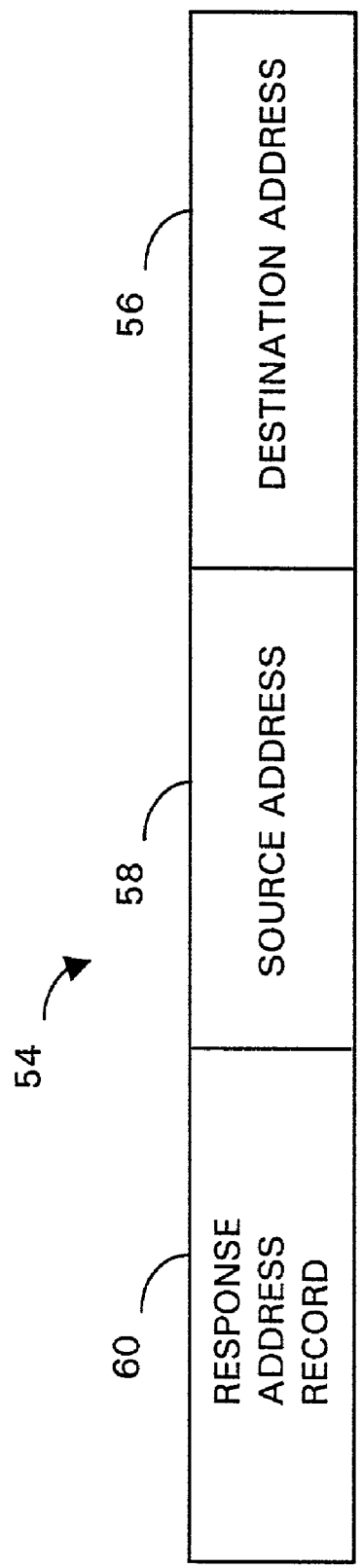
FIG. 5 is a schematic diagram of an IPv6 DNS Response message resulting from conversion of the IPv4 DNS Response message of FIG. 4.

The controller 64A (i) receives from the protocol converter 32A the output IPv6 DNS Response message comprising destination address field 56, source address field 58, response address record 60, and additional records 50, 52; and (ii) retrieves the IPv6 address from the second additional record 52, i.e. the true IPv6 address of the destination host 30, and inserts it into the response address record 60 of that output message instead of the IPv4-compatible IPv6 address for the destination host 30, which the protocol converter 32A had generated. The controller 64A then strips off the additional records 50, 52, and sends the resulting IPv6 DNS Response message 54 (see FIG. 5) to an IPv6 network interface controller 62A of the border router 16A for transmission to the source host 28.

Additionally, the controller 64A is arranged to retrieve the IPv4 address of the tunnel terminating endpoint from the first additional record 50, to create a mapping of the IPv6 address of the destination host 30 to the address of the IPv4 tunnel terminating endpoint, and to store this mapping, i.e. create an entry, in an IPv6/tunnel endpoint table 76A formed by part of an internal memory 68A of the controller 64A and constituting a look-up table.

In a variant, the additional records 50, 52 are stripped from the DNS Response message prior to the retrieval of their contents. In another variant, the additional records remain attached to the DNS Response message, but this is not as efficient as stripping the additional records. In this present embodiment, each entry in the IPv6/tunnel endpoint table 76A comprises a first element 78A comprising the IPv6 address of a corresponding destination host 30, a second element 80A comprising the IPv4 address of the tunnel terminating endpoint, i.e. of the border router 16B, and third and fourth elements 82A and 84A, to be described later.

Upon receipt of the resultant IPv6 DNS Response message 54, the source host 28 retrieves the IPv6 address from its address record 60 and stores it for use in sending data packets to the destination host 30.

In known manner, the source host 28 generates for each of these data packets a header including a source address field and a destination address field, and writes the retrieved IPv6 address into the destination address field.

Upon receipt of each of these data packets at the border router 16A, the controller 64A retrieves the destination address, and, in accordance with the retrieved destination address, accesses the IPv6/tunnel endpoint table 76A. If there is a match with the contents of a first element 78A of an entry, the controller 64A retrieves the corresponding IPv4 tunnel terminating endpoint from the second element 80A of that entry, and commands an encapsulator 86A to encapsulate the packet in an IPv4 packet. Thus, the encapsulator 86A appends an IPv4 header into which it has inserted its own IPv4 address into the source field, and the retrieved IPv4 tunnel terminating endpoint address into the destination field. In this embodiment the encapsulator 86A stores its own IPv4 address for this use. In variants, the controller 64A stores this IPv4 address, and passes it, together with the retrieved IPv4 tunnel terminating endpoint address, to the encapsulator 86A when commanding it to perform encapsulation.

In this embodiment, the encapsulator 86A is arranged to receive the packet directly from the IPv6 network interface controller 62A of the border router 16A, but it does not perform encapsulation until commanded by the controller 64A. In a variant, the controller 64A receives the packet directly from the IPv6 network interface controller 62A and passes it to the encapsulator 86A if there is a match. In practice, when the border router 16A receives a packet the controller 64A writes it into a storage location of its internal memory 68A, and the controller 64A will pass to the encapsulator 86A the address of the relevant storage location, together with an instruction for the encapsulator 86A to access that storage location.

Upon receipt of the encapsulating IPv4 packet at the border router 16B, an un-encapsulator 88B of the border router 16B strips off the IPv4 header and retrieves the payload of that IPv4 packet, i.e. un-encapsulates the original IPv6 packet from the source host 28, and sends that IPv6 packet to the destination host 30. The controller 64B also creates a mapping (in its IPv6/tunnel endpoint table 76B) of the IPv6 address of the source host 28 and the tunnel originating endpoint, i.e. the IPv4 address of the originating border router 16A, these being respectively retrieved from the source address field of the IPv6 header and the source address field of the IPv4 header.

When the destination host 30 returns a Reply packet, a controller 64B of the border router 16B retrieves the destination address, "IPv6 host 28", from the received Reply packet, accesses its IPv6/tunnel endpoint table 76B in accordance with the retrieved destination address (i.e. seeking a matching element 78B), retrieves the corresponding IPv4 address (element 80B), and commands an encapsulator 86B to encapsulate the Reply packet in an IPv4 packet addressed to an un-encapsulator 88A of border router 16A using the IPv4 tunnel originating endpoint address just retrieved from the element 80B of the IPv6/tunnel endpoint table 76B. Upon receipt of this IPv4 packet at the border router 16A, the un-encapsulator 88A performs un-encapsulation to retrieve the Reply packet, and the border router 16A then sends the retrieved Reply packet to the source host 28.

The source host 28 and the destination host 30 are now in a session in which IPv6 packets pass between them via the tunnel just established between the border routers 16A and 16B.

The above described mechanism provides for an IPv6 host, which is in an isolated IPv6 domain, to communicate with another IPv6 host, which is in another isolated IPv6 domain, via an intermediate IPv4 domain, without any knowledge of where that other IPv6 host is, and without the source IPv6 host needing to do anything different from a standard communication procedure with another IPv6 host within its own IPv6 domain. The DNS server local to the source IPv6 host makes a Request via the IPv4 domain to the IPv6 DNS server that is on the same network as the destination IPv6 host, and the border routers automatically set up respective mappings associating the tunnel endpoint and the IPv6 address of the IPv6 hosts behind the border routers.

In alternative embodiments, some of the entries in the IPv6/tunnel endpoint table 76A can be created by the administrative personnel of the network operator. This is known as manual configuration of a tunnel, and the tunnel is permanent until changed at a later date by the administrative personnel.

Figure 2:
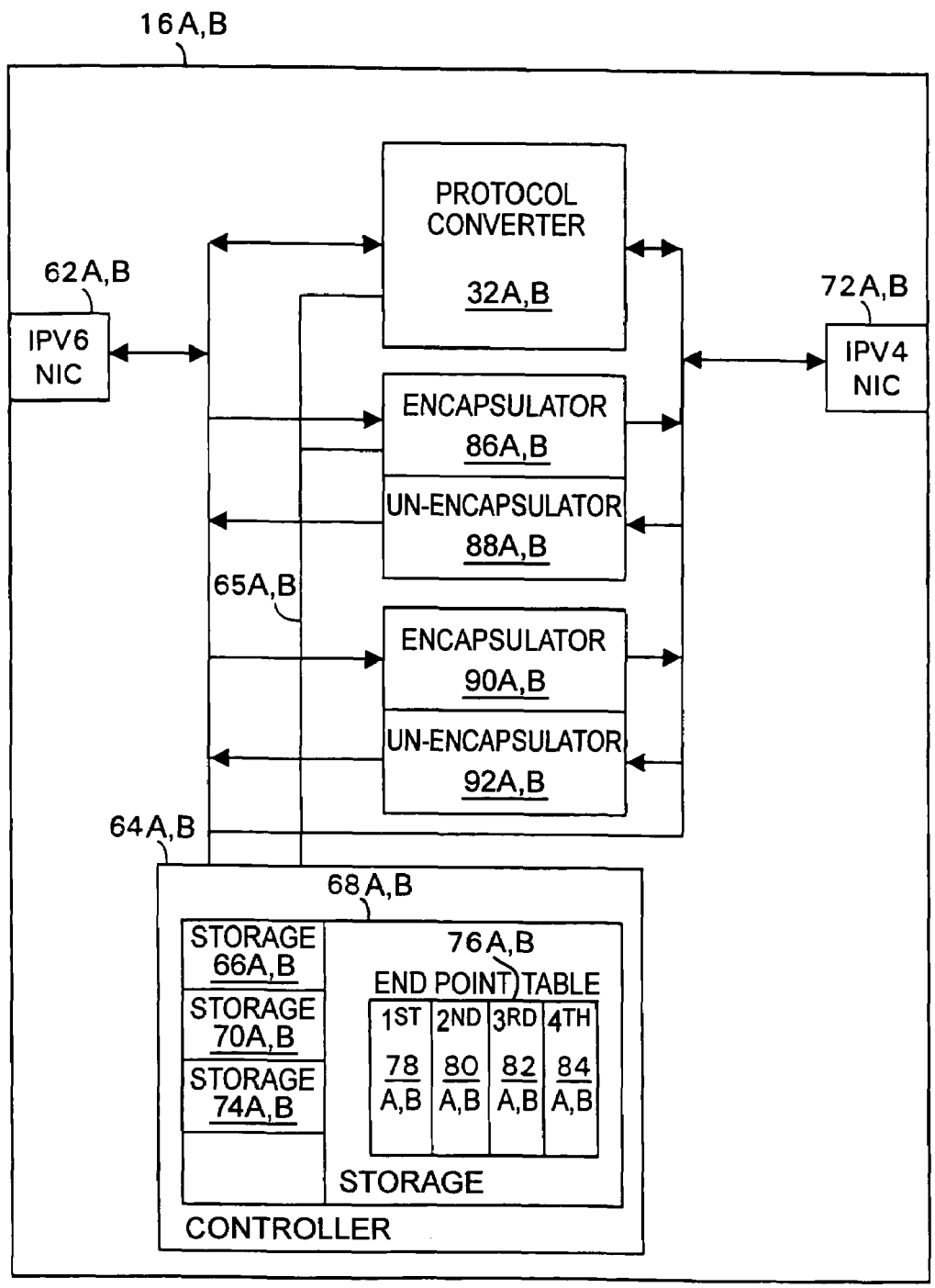
FIG. 2 is a schematic diagram of a border router.
Figure 6:
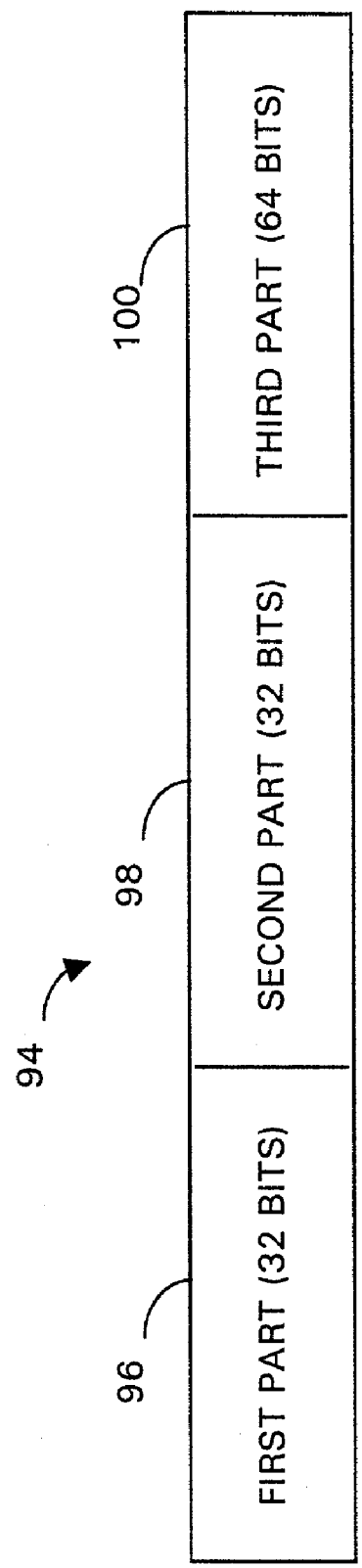
FIG. 6 is a schematic diagram showing the format of special IPv6 addresses used with the 6to4 tunnelling technique.

As shown in FIG. 2, the border router 16A also comprises a 6to4 tunnelling encapsulator 90A (and 6to4 tunnelling un-encapsulator 92A) and can thus interwork with a border router which is similarly enabled, although in variants these may be omitted. The special IPv6 addresses 94 (see FIG. 6) used for this technique have a three-part format of which a first part 96 having thirty two bits is a prefix uniquely identifying that the packet is to be tunnelled by the 6to4 tunnelling technique, a second part 98 having thirty two bits is the IPv4 address of the 6to4 tunnel endpoint, and the third part 100 having sixty four bits is known as the interface ID which is the modified MAC address of the destination host. The second part 98 constitutes a predetermined subaddress field of the destination address of the present invention.

In variants having a different tunnelling encapsulator, a different respective prefix is used for the same purpose.

In some variants of these embodiments, the controller 64A is arranged to recognise the presence of this prefix within the retrieved destination address of a received packet, to retrieve from its second part 98 the IPv4 address of the 6to4 tunnel endpoint and to command the 6to4 tunnelling encapsulator 90A to handle the received packet using the retrieved IPv4 address. This constitutes deriving the second type address directly. Alternatively, the 6to4 tunnelling encapsulator 90A is arranged to retrieve the special IPv6 address and to extract from its second part 98 the IPv4 address of the 6to4 tunnel endpoint.

Where, as mentioned above, the controller 64A is arranged to perform prefix recognition, the prefix to be recognised is stored in a storage location of its internal memory 68A, and this storage location can be an entry or part of an entry of the IPv6/tunnel endpoint table 76A.

The un-encapsulators 88B and 92B have respective IPv4 addresses, which are used by the corresponding encapsulators 86A and 90A in generating their respective encapsulated packets.

In the preferred arrangement of border router having a plurality of different encapsulators, e.g. 86, 90, the controller 64A accesses the IPv6/tunnel endpoint table 76A in accordance with a set of match criteria to cover the range of possible situations. These are (a) a tunnel has already been established by the above described DNS Request technique and a IPv6 destination-specific IPv6/IPv4 entry exists in the IPv6/tunnel endpoint table 76A;

(b) a tunnel has already been established by one of the known tunnelling techniques and an IPv6/IPv4 entry exists in the IPv6/tunnel endpoint table 76A, of which the first element 78A has a first part in the form of a specific prefix corresponding to that tunnelling technique;

(c) network management personnel have manually configured the border router 16 to define a tunnel to a specific IPv6 destination host using 6to4 (or 6over4) to another border router (which might be the border router 16B or a different border router (not shown) associated with a further IPv6 domain (not shown)), and for this case the IPv6/tunnel endpoint table 76A has an entry whose first element 78A is the IPv4-compatible (or IPv4-mapped) address of that destination host;

(d) network management personnel have manually configured the border router 16A to define a tunnel to unspecified IPv6 destination hosts using 6to4 (or 6over4) to another border router (which might be the border router 16B or a different border router associated with a further IPv6 domain), and for this case the IPv6/tunnel endpoint table 76A has an entry having its first element 78A in the form of the 6to4 (or 6over4) prefix followed by the IPv4 address of that other border router followed by null characters, and in some variants the second element 80A of this entry contains null characters, whilst in yet other variants the second element 80A of this entry contains the IPv4 address of that other border router; and (e) the table contains an entry whose first element 78A is a generic IPv4-compatible or IPv4-mapped IPv6 address, i.e. its first eighty bits are all zeros and the final thirty two (or in a variant, forty eighty) bits are null characters (zeros), the second and fourth elements 80A and 84A contain null characters, and a third element 82A contains the identifier "PC".

The controller 64A uses its IPv6/tunnel endpoint table 76A to determine the appropriate handling of a received packet in the following manner.

If the controller 64A finds an entry having a first element 78A matching the complete retrieved destination address, then the content of the second element 80A of that entry is retrieved and used as the IPv4 destination address, i.e. that of the border router 16B, the tunnel endpoint. Additionally, the content of the third element 82A of that entry is retrieved and used as a check that the retrieved IPv4 destination address and the packet received by the border router 16A are to be processed by the encapsulator 86A. The content of the third element 82A is either an identifier for an encapsulator 86A, 90A (e.g. "EN") or an identifier for the protocol converter 32A (e.g. "PC"). As a further check, the fourth element 82A of that entry contains an identifier for the encapsulation type. In other words, for an entry matching the complete retrieved destination address, as just described, the encapsulation type identifier will be "DNS" to signify that the encapsulator 86A is to be used.

If the controller 64A finds an entry whose first element 78A has the first thirty two bits matching the first thirty two bits, i.e. the special 6 to 4 prefix part, of the retrieved destination address, then the third and fourth elements 82A and 84A of that entry are checked ("EN" and "6to4", respectively), the IPv4 destination address is retrieved from the second element 80A of that entry and sent with the packet received by the border router 16A to be processed by the encapsulator 90A. This constitutes indirectly retrieving the second type address from a predetermined subaddress field of the destination address.

If the retrieved destination address is either IPv4-compatible or IPv4-mapped, i.e. the packet is to be protocol converted for an IPv4 destination, then its first eighty bits will be all zeros, and the following sixteen bits will be either all zeros if the address is IPv4-compatible, or all ones if the address is IPv4-mapped. Thus the controller 64A checks to see whether its IPv6/tunnel endpoint table 76A contains an entry whose first element 78A has its first eighty bits all zeros The content of the second element 80A of such an entry will be all null characters, because no tunnel is involved, and the content of the fourth element 84A of such an entry will be all null characters, because no encapsulation is involved. The content of the third element 82A of that entry is retrieved and used as a check that the retrieved IPv4 destination address and the packet received by the border router 16A are to be processed by the protocol converter 32A. In this case, the content of the third element 82A is an identifier for the protocol converter 32A (e.g. "PC").

In other variants, the controller 64A is arranged to access the IPv6/tunnel endpoint table 76A, as before, and only command the 6to4 tunnelling encapsulator 90A upon detecting a match with an entry, and in this case the controller 64A passes the special IPv6 address to the 6to4 tunnelling encapsulator 90A, or alternatively the controller 64A extracts the IPv4 address of the 6to4 tunnel endpoint and passes it to the 6to4 tunnelling encapsulator 82A, or yet again the controller 64A, upon detecting such a match, retrieves the element 80A of the matching entry. This element 80A contains the IPv4 address of the 6to4 tunnel endpoint, which was inserted into that element 80A by the controller (or manually) upon creation of that entry.

In the above embodiment, the local DNS server for the source host 28 is the IPv6 DNS server 24, but in alternative embodiments it can be one of the IPv4 servers 22 of the DNS 20. In such alternative embodiments, although the host 28 can send a DNS Request message for obtaining the IPv6 address of the host 30 and, by the present invention, establish a tunnel across the IPv4 domain 10, the situation is not symmetrical in that the host 30 cannot act as a source and establish a corresponding tunnel across the IPv4 domain 10 to the host 28. For an IPv6 host to be contactable, i.e. act as destination, by the method of the present invention, it is necessary for the DNS server local to that IPv6 host to be an IPv6 DNS server on the same IPv6 domain as that IPv6 host, because the DNS Response message has to pass through the border router adjacent to that IPv6 host in order that the tunnel can be established. In other words, the DNS Request message has to pass through the IPv4 domain and not stop at an IPv4 DNS server acting as the local DNS server for the intended destination IPv6 host.

What is claimed is:

1. A method of operating an interface between a first network and a second network, the first network having network addresses in accordance with a first addressing convention, herein referred to as first type addresses, and transmitting messages in accordance with a first transmission protocol, herein referred to as first type messages, and the second network having network addresses in accordance with a second addressing convention, herein referred to as second type addresses, and transmitting messages in accordance with a second transmission protocol, herein referred to as second type messages, the method comprising:

examining the destination address of a first type message received from the first network; and if the destination address of that received first type message is of a first predetermined format in accordance with the first addressing convention, protocol converting that received first type message;

and if not, encapsulating that received first type message in accordance with the second transmission protocol, using, as the destination address of a resulting encapsulating second type message, a second type address derived, directly or indirectly, from the destination address of that received first type message.

2. A method as in claim 1, wherein the examining step comprises the substeps of retrieving the destination address from the received first type message, and accessing a look-up table in accordance with the retrieved destination address.

3. A method as in claim 2, for use when the look-up table comprises entries in the form of a first type address associated with a second type address, and wherein retrieval of the second type address of an entry having its first type address matching the destination address constitutes indirectly deriving the second type address from the destination address of that received first type message.

4. A method as in claim 3, for use when the look-up table entries include a first identifier field containing an identifier identifying whether that first type message is to be protocol converted or encapsulated, and including the steps of retrieving the identifier from the first identifier field of the entry having its first type address matching the destination address, and checking that the retrieved identifier is consistent with whichever of protocol conversion or encapsulation is to be performed upon that received first type message.

5. A method as in claim 3, for use when the look-up table entries includes a second identifier field containing an identifier identifying an encapsulation type, and when there is a plurality of encapsulation types available, and including the steps of retrieving the identifier from the second identifier field of the entry having its first type address matching the destination address, and checking that the retrieved identifier is consistent with the type of encapsulation to be performed upon that received first type message.

6. A method as in claim 1, wherein the first predetermined format includes a first predetermined portion whose content identifies that received first type message as suitable for protocol conversion.

7. A method as in claim 6, wherein the first predetermined format also includes a second predetermined portion whose content constitutes the second type address used as the destination address of a resulting encapsulating second type message.

8. A method as in claim 1, wherein the second type address is derived directly by retrieving it from a predetermined subaddress field of the destination address.

9. An interface for use between a first network operating in accordance with a first transmission protocol and having network addresses in accordance with a first addressing convention, herein referred to as first type addresses, and a second network operating in accordance with a second transmission protocol and having network addresses in accordance with a second addressing convention, herein referred to as second type addresses, the interface having both a first type address and a second type address and comprising:

a protocol converter arranged to convert a message having a format in accordance with the first transmission protocol, herein referred to as a first type message, into a message having a format in accordance with the second transmission protocol, herein referred to as a second type message;

an encapsulator arranged to respond to receipt of a second type address together with a first type message by encapsulating that received first type message as the payload of a resulting encapsulating second type message, using that received second type address as the destination address of the resulting encapsulating second type message and using the second type address of the interface as the source address of the resulting encapsulating second type message; and an interface controller arranged to respond to receipt by the interface of a first type message from the first network by
   (a) examining the destination address of that first type message received from the first network to determine whether the first type message is of a format in accordance with the first transmission protocol, and,
   (b) if so, sending to the protocol converter that first type message received from the first network, and,
   (c) if not, deriving, directly or indirectly, from the destination address of that first type message, a second type address for use by the encapsulating means, and sending to the encapsulating means the derived second type address together with that first type message received from the first network.

10. An interface as in claim 9, wherein the controller is arranged to derive the second type address indirectly by accessing, in accordance with the destination address, a look-up table having entries in the form of a first type address associated with a second type address, and retrieving the second type address of an entry having a first type address matching the destination address.

11. An interface as in claim 10, wherein each entry of the look-up table comprises a field for containing an identifier for identifying whether the controller is to send that first type message received from the first network to the protocol converter or to the encapsulating means.

12. An interface as in claim 10 wherein the encapsulating means comprises a plurality of different encapsulators, each encapsulator being arranged to operate in accordance with a respective encapsulation type, and the controller is arranged to send that first type message received from the first network to the appropriate one of said plurality of different encapsulators in dependence upon the format of the destination address of that first type message; and
   wherein each entry of the look-up table comprises a field for containing an identifier for identifying a type of encapsulation.

13. An interface as in claim 9, wherein the controller is arranged to derive the second type address directly by retrieving it from a predetermined subaddress field of the destination address.

14. An interface as in claim 9, wherein the encapsulating means comprises a plurality of different encapsulators, each encapsulator being arranged to operate in accordance with a respective encapsulation type, and the controller is arranged to send that first type message received from the first network to the appropriate one of said plurality of different encapsulators in dependence upon the format of the destination address of that first type message.

15. An interface according to claim 9, further including means for un-encapsulating an encapsulating second type message to retrieve its payload.

16. An interface according to claim 9 wherein the protocol converter is further engaged to convert a second type message into a first type message.

17. A method of operating an interface between a first network and a second network, the first network having network addresses in accordance with a first addressing convention, herein referred to as first type addresses, and transmitting messages in accordance with a first transmission protocol, herein referred to as first type messages, and the second network having network addresses in accordance with a second addressing convention, herein referred to as second type addresses, and transmitting messages in accordance with a second transmission protocol, herein referred to as second type messages, the method comprising:

examining the destination address of a first type message received from the first network; and if the destination address of that received first type message is of a first predetermined format in accordance with the first addressing convention, protocol converting the received first type message; and if the destination address of that received first type message is of a second predetermined format in accordance with the second addressing convention, encapsulating that received first type message in accordance with the second transmission protocol, using, as the destination address of a resulting encapsulating second type message, a second type address derived, directly or indirectly, from the destination address of that received first type message.

18. A method as in claim 17, wherein the second predetermined address format includes an identifier identifying an encapsulation type.

19. An interface for use between a first network and a second network, the first network having network addresses in accordance with a first addressing convention, herein referred to as first type addresses, and transmitting messages in accordance with a first transmission protocol, herein referred to as first type messages, and the second network having network addresses in accordance with a second addressing convention, herein referred to as second type addresses, and transmitting messages in accordance with a second transmission protocol, herein referred to as second type messages, the interface comprising:

means for examining the destination address of a first type message received at the interface apparatus from the first network to determine whether the destination address of that received first type message is of a first predetermined format in accordance with the first addressing protocol;

means for converting protocol responsive to a determination of the examining means that the destination address of that received first type message is of the first predetermined format to convert that received first type message; and means for encapsulating responsive to a determination of the examining means that the destination address of that received first type message is not of the first predetermined format to encapsulate that received first type message in accordance with the second transmission protocol, using, as the destination address of a resulting encapsulating second type message, a second type address derived, directly or indirectly, from the destination address of that received first type message.

* * * * *